Figure 1:
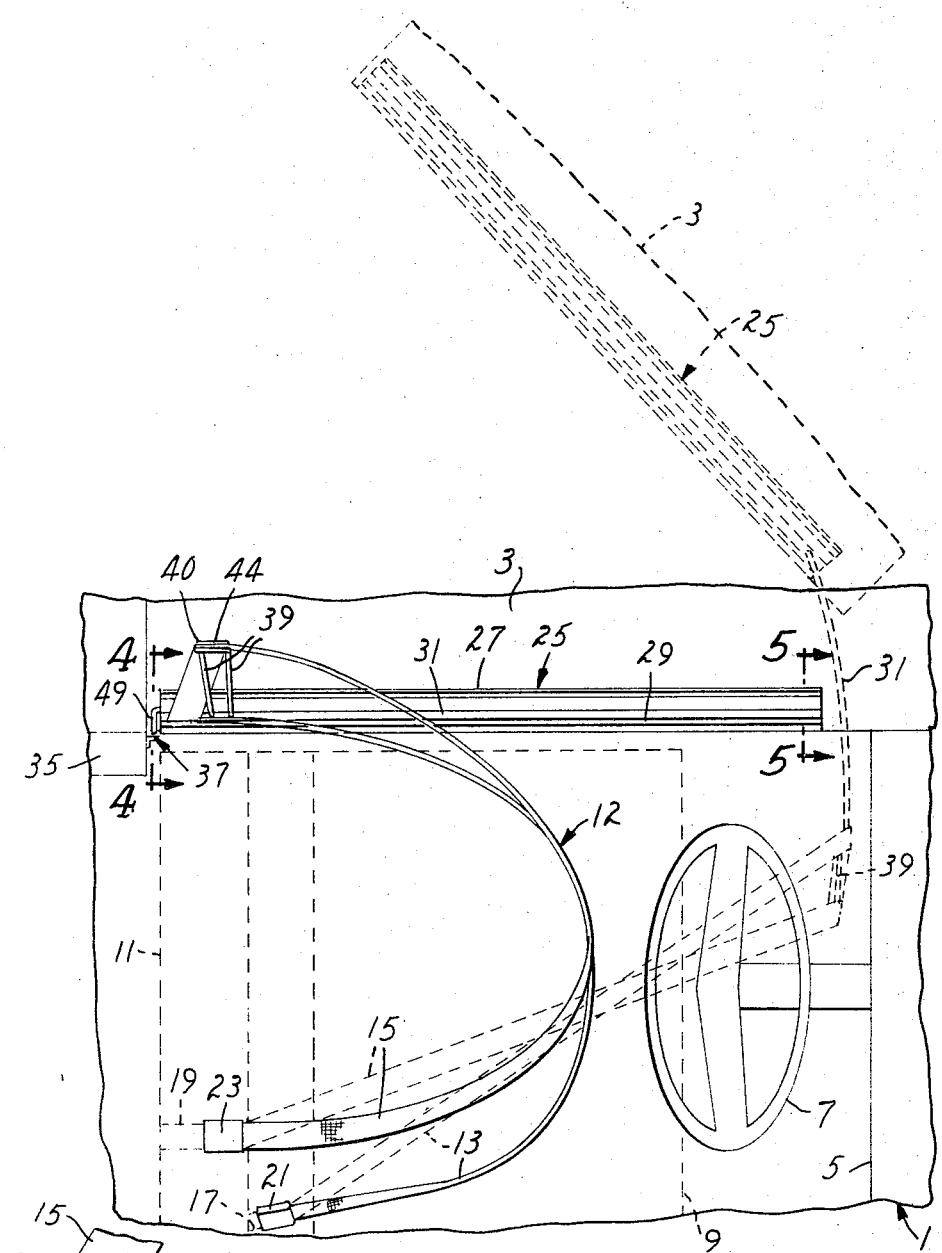

United States Patent [19]
Strom

[11] 3,840,249
[45] Oct. 8, 1974

[54] AUTOMATIC SAFETY BELT ASSEMBLY
[76] Inventor: Arnold J. Strom, 2168 Reaney Dr., St. Paul, Minn. 55119
[22] Filed: Mar. 19, 1973
[21] Appl. No.: 342,720

[52] U.S. Cl. ......................................... 280/150 SB
[51] Int. Cl. ............................................. B60r 21/02
[58] Field of Search .............. 280/150 SB; 180/82 C

[56] References Cited
UNITED STATES PATENTS
3,583,726   6/1971   Lindblad ...................... 280/150 SB

*Primary Examiner*—David Schonberg
*Assistant Examiner*—Michael J. Forman
*Attorney, Agent, or Firm*—Walter N. Kirn, Jr.

[57] ABSTRACT

An assembly for positioning vehicular safety belts automatically in restraining and non-restraining positions in response to opening and closing of a vehicular door, including a channel member mounted longitudinally along the lower edge of the door, an arm pivotally mounted at one end at a forward location of the channel member, safety belt means conventionally mounted at one point and connected at another point to the aforementioned arm, the arm being so constructed and designed that it swings from an upright position, wherein the safety belts are non-restraining, in a non-planar, outwardly arcuate path in response to closing of the door to a horizontal, locked position wherein the safety belts are restraining, and wherein the movement is reversed in response to opening the door.

5 Claims, 5 Drawing Figures

AUTOMATIC SAFETY BELT ASSEMBLY

This invention relates to a safety device for vehicles. More particularly, it relates to an assembly for positioning safety belts in restraining and non-restraining relationship to seated vehicle passengers automatically in response to opening and closing of a vehicle door.

While safety belts of various types have been known and used for many years, and have become mandatory standard equipment on all new cars sold in the United States, the hazards such safety devices were designed to eliminate have not been removed. The primary reason for this failure to achieve the desired safety level is that people simply do not buckle the belts provided them whether out of laziness, forgetfulness, or some other human frailty.

The assembly of the present invention eliminates to a great extent the source of the present problem by providing for the automatic positioning of the safety belts in the restraining position upon closing the car door without the need for a buckling operation. Upon opening the door, the belts, which preferably include both a lap and a shoulder belt, are loosened automatically without any need for unbuckling, to permit easy egress and ingress to the car seat. While provision is made for unbuckling or disengaging the safety belts if one desires, the need to unbuckle is eliminated.

This is not the first attempt to solve the problem of non-use of safety belts occasioned by the human predisposition to laziness or forgetfulness. For example, U.S. Pat. No. 2,858,144 describes a safety belt assembly operative between an open and restraining position in response to the opening or closing of a vehicular door. The mechanism for performing the function of arranging the seat belt in such positions is rather complicated, however, involving many mechanical and electrical components. Because of the complicated nature of the mechanism, and its obvious high cost of manufacture, such a seat belt assembly would not appear attractive to the highly competitve and cost conscious automobile manufacturing industry. And again because of its complicated and expensive nature, such a seat assembly would not appear feasible for the auto-after market.

A further drawback to automatic safety belt assembly is the hazard posed to occupants by such devices themselves. Many assemblies require bulky equipment with sharp projections which can cause severe injury if any seat belt failure does occur. Others involve automatic closing means which while triggered by manually commencing opening or closing of the door are otherwise independently operable. This is a hazard especially to small children who can get their hands caught in the mechanism and cannot be freed quickly.

It is a principal object of this invention to provide and assembly for positioning vehicular safety belts in restraining and non-restraining relationship to a passenger not requiring buckling and unbuckling of the belts for operation.

Another object is such an assembly which automatically arrives at the restraining position upon closing the door associated with the seat to be occupied by the vehicle passenger.

It is another object to provide an assembly which is automatically moveable without unbuckling to a non-restraining position upon opening the door with which the assembly is associated.

A still further object is the provision of an assembly for positioning safety belts which is relatively simple in design, economical, easy to mount as both original and after-market equipment, does not itself pose hazards, and does not require any electrical or other power source for operation other than that provided by manually opening and closing the car door.

These and other objects which will be apparent hereinafter are accomplished in the present invention by a seat belt assembly including safety belt means for restraining passenger movement fixedly mounted within the interior of a vehicle, the improvement which comprises a yieldable arm adapted for pivotal mounting on the interior wall of a vehicle door, said safety belt means being operatively connected to said yieldable arm whereby said yieldable arm pivots in an arcuate, non-planar path between a first position wherein said safety belt means are in a restraining relationship to said passenger and a second position wherein said safety belt means are in a non-restraining relationship to said passenger in response to closing and opening of said vehicle door.

In a preferred embodiment, the invention is an assembly for positioning vehicular safety belts automatically in response to opening and closing of a vehicular door comprising:

1. means mountable on the interior of a vehicular door, said means including pivotal mounting means and locking means is spaced alignment with said pivotal mounting means,
2. yieldable arm means adapted for pivotally mounting on one end thereof on said pivotal mounting means, and
3. safety belt means having a first portion fixedly mountable interior of said vehicle and a second portion thereof spaced from said first portion a distance capable of allowing the portion of said belt between said first and second portions to restrain the forward movement of a passenger, said second portion of said belt means being operatively connected to said yieldable arm at a location on said arm spaced from said one end of said arm, said yieldable arm being adapted to pivotally move, in response to opening and closing said vehicular door, in an arcuate, non-planar path between a non-restraining position when said vehicular door is open and a restraining position engageable with said locking means when said door is closed.

Figure 2:
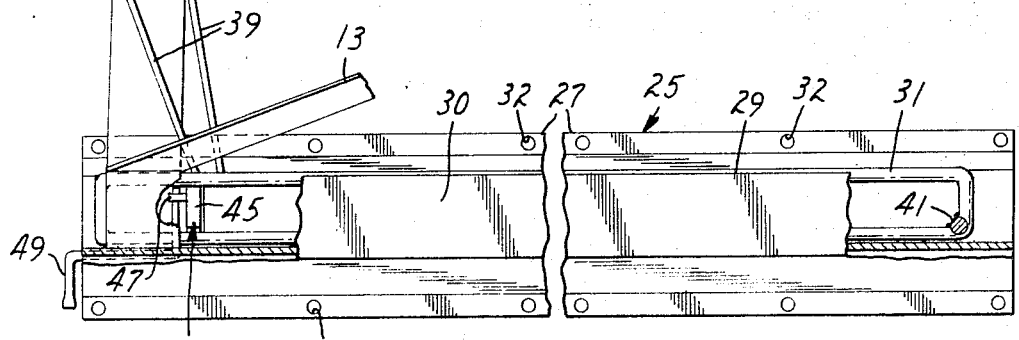
Figure 3:
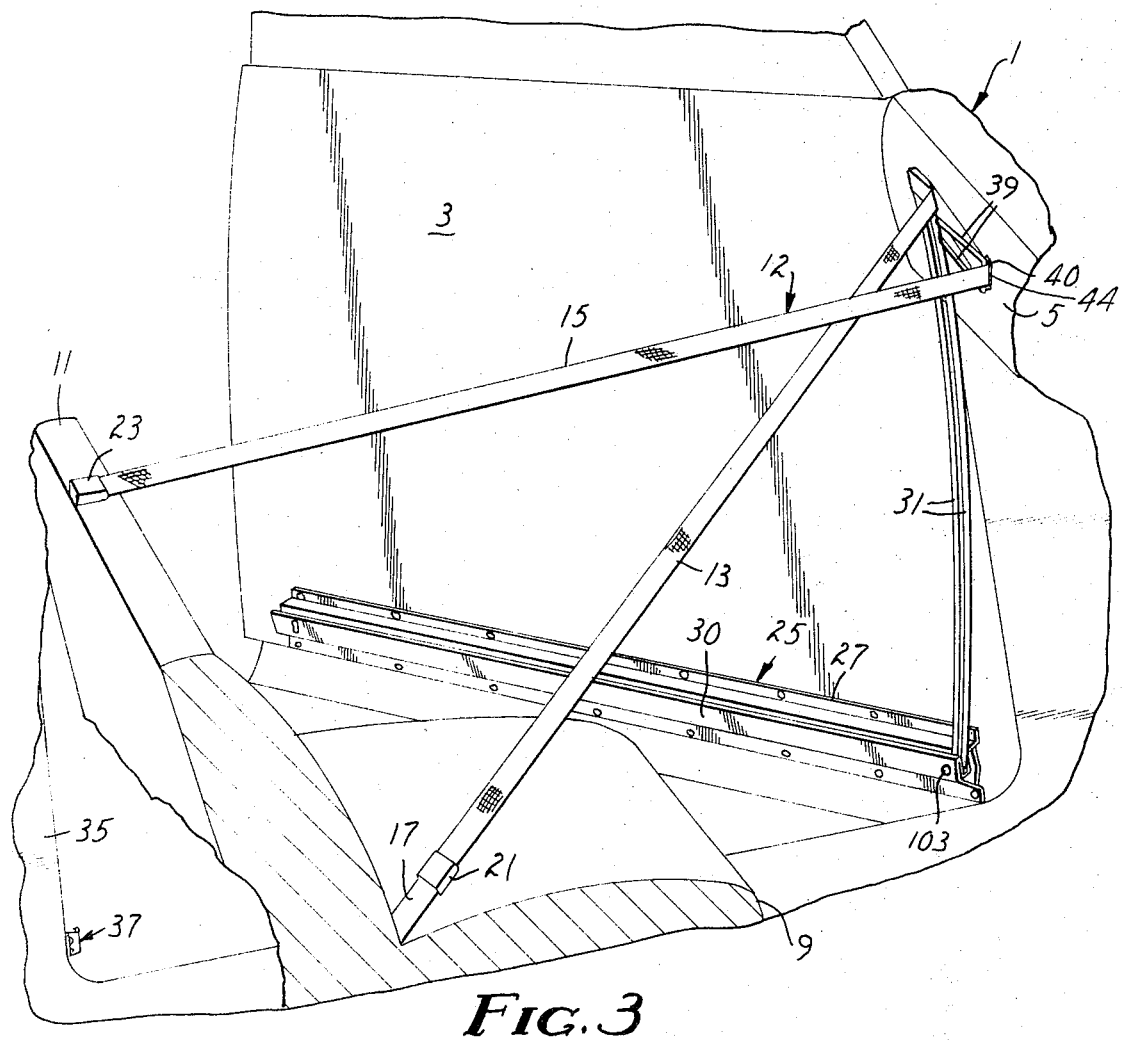
Figure 4:
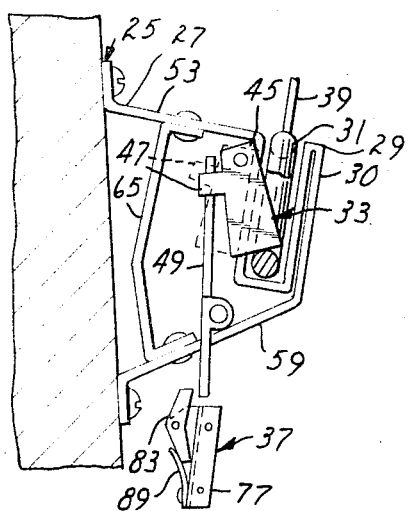
Figure 5:
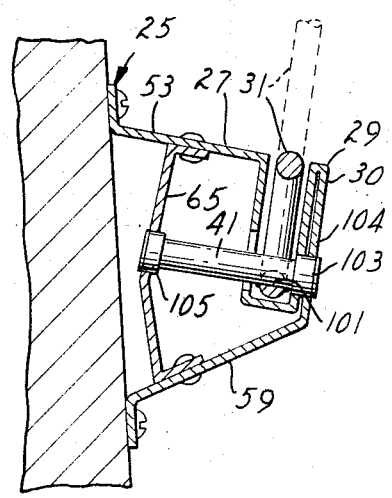

The attached drawings are:

FIG. 1 — a top view of a car interior showing the seat belt assembly of this invention;

FIG. 2 — a side elevational view of a portion of the seat belt assembly in the door closed position;

FIG. 3 — a perspective view with the seat belt assembly shown in the door open position;

FIG. 4 — a cross-sectional view with portions broken away taken along the line 4—4 of FIG. 1; and FIG. 5 — a cross-sectional view taken along line 5—5 of FIG. 1.

Referring to FIG. 1, there is shown a portion of a vehicle 1 including a door 3, dash panel 5, steering assembly 7, front seat 9, and back rest 11. Mounted in a conventional manner is a belt 12 having a lap piece 13 and shoulder piece 15. Door 3 is shown closed in solid lines and open in broken lines. Lap and shoulder pieces 13 and 15 are shown in the restraining position in solid lines and in the non-restraining position in broken lines.

The belt 12 is preferably of a single continuous length of material which provides both the lap and shoulder piece. Mounted in a conventional manner are belt attaching pieces 17 and 19 terminating in conventional buckles 21 and 23 for attachment to lap and shoulder pieces 13 and 15, respectively to provide a belt assembly or means. Belt attaching piece 19 is shown mounted on back rest 9 although other mounting points such as the ceiling are also suitable.

Mounted on the interior of the door 3 is a channel member 25. This channel member 25 is of a rigid, stable construction mounted by bolts or the like near the longitudinally extending lower edge of the door 3. While a separate mountable channel member 25 is preferred, it may be constructed as an integral part of the door if desired. Channel member 25 includes a longitudinally extending frame 27 having a U-shaped piece 29 within which is housed arm 31 when the door 3 is closed. Securably holding arm 31 in U-shaped piece 29 is a locking mechanism 33. Mounted on the center, vertical post 35 of the car is a trip assembly 37, the operation of which will be explained hereinafter. Other mounting sites such as the floor of the car adjacent the door 3 may also be used.

Lap and shoulder pieces 13 and 15, respectively, are shown in dark lines in body restraining position. As noted above, belt 12 is preferably a single continuous length of material although individual belts could be employed. Lap piece 13 is directly attached to one end of arm 31 whereas shoulder piece 15 is attached to secondary arm 39 which is mounted on arm 31. Secondary arm 39 terminates in a holding member 40 providing a slot 44 through which passes belt 12 to provide a means for holding belt 12 in place. Again, when belt 12 is a single continuous piece, the lap portion 13 is merely looped around arm 31 and then passed to secondary arm 39 and back to adjusting buckle 23.

Another suitable design for the secondary arm is a fork-like member with the tines projecting away from yieldable arm 31. Shoulder piece 15 is then equipped with a clip which slips over the ends of the tines holding the shoulder piece in place. Secondary arm 39 is an optional but highly preferred feature. Shoulder piece 15 is generally slightly longer than lap piece 13. To compensate for this additional length, the shoulder piece 15 is directed around secondary arm 39 to take up the slack which would otherwise be present. Among other things, when yieldable arm 31 is in its upright generally vertical position, this allows shoulder piece 15 to extend in a straight, taut line allowing the passenger to slide in and out of the associated seat without interference with the shoulder piece 15. Further, by having taut belt pieces, the forces initiated by swinging of the hingably mounted door can be readily transmitted via the belt pieces to the yieldable arm 31. Secondary arm 39 is preferably constructed of flexible material which yields slightly when the shoulder piece 15 is taut such as when the belts are non-restraining. It should be noted that the operative connection of the belt means 12 of the yieldable arm 31, either directly as in the case of lap piece 13 or indirectly in the case of shoulder piece 15, can be readily disengaged if desired. In the embodiment shown, lap piece 13 can be slipped off of yieldable arm 31 and shoulder piece 15 can be slipped out of slot 44.

As can be seen, when door 3 is fully open (FIG. 1, dotted lines) arm 31 is actually bent into a curved configuration, the curvature being such that the portion of arm 31 to which the belt 12 is attached (the free end of arm 31 as opposed to the pivotally attached end) is curved inwardly toward the interior of the car and away from the door. Bending of arm 31 commences as the door is opened and belt 12 becomes taut, the arm 31 traversing an upward and inward (relative to the car interior) arcuate path. The path so traversed may be said to be non-planar as well as arcuate due to the inward movement of the arm 31. This motion is reversed when the door is swung shut.

The opening of the door applies a force on the belt 12 and thus to the remainder of the linked elements, this force in turn being sufficient to unlock arm 31 from its locked position, move arm 31 upward and cause bending of the arm 31 inwardly without breaking the belt assembly internally or at any point of attachment. Upon closing door 3, the tension on belt 12 is gradually diminished while still maintaining belt 12 substantially taut. Thus, belt 12 preferably serves as a positive restraint or brake on substantially the entire downward movement of yieldable arm 31. The advantage of this is that yieldable arm 31 does not slam shut of its own accord once the downward movement begins or is in progress, a situation which would pose a serious danger to people, especially children who might get their limbs in the way. Preferably, only when arm 31 is a short distance from the locked position, generally a few inches, does the pull of gravity take over and drop the arm 31 into the U-shaped piece 29.

FIG. 2 illustrates in greater detail the configuration of the various elements of the assembly when the door 3 is closed. Channel member 25 includes frame 27 and U-shaped piece 29, the inner wall 30 of which is partially broken away to display arm 31 housed within the channel so provided. Channel member 25 is mounted to the inner wall of door 3 by bolts or the like at apertures 32. Arm 31, as here shown, is a continuous rod in an elongated rectangular shape one end of which is pivotally mounted to channel member 25 and within U-shaped piece 29 by rod 41. Other arm shapes, for example, a solid or apertured blade, could be employed as well.

The free end of arm 31 is locked in the U-shaped piece 29 when the door is closed by means of a locking mechanism which includes a spring-loaded latch 45 having shoulder 47 connected to trip arm 49. Jutting upwardly in this locked position from arm 31 is secondary arm 39.

In FIG. 3 can be seen the position of the belt 12 when door 3 is opened. As is readily visualized, the belt 12 is substantially taut at this point and allows for easy egress and ingress of the passenger. The additional length between the end of arm 31 when upright and the points of attachment of belt 12 is accommodated by arm 31 which curves inwardly and toward seat 9. As door 3 closes and this length decreases, arm 31 assumes a straight or non-curved configuration. As a result, a buckle adjustment of belt length is avoided, and once length is set for an individual, further adjustments are unnecessary. The degree of curvature which arm 31 should be capable of assuming depends on the distance to be compensated for when the door is open versus closed. The optimum situation is an arm 31 which, for a given setting, is sufficiently yieldable that the door 3 can be fully opened without adjusting the length of belt 12 to provide easy ingress and egress of the passenger and door 3 can also be closed, again without adjusting the length of belt 12, to provide a snug, comfortable, safe restraint for the passenger. Suitable flexible or yieldable materials of which arm 31 may be constructed include spring steel and fiberglass.

In FIG. 4, arm 31 is locked in U-shaped piece 29 by spring-loaded latch 45 having shoulder 47 connected to trip arm 49.

Operatively associated with the locking mechanism is trip assembly 37 for actuating trip arm 49. Trip assembly 37, mounted on the car interior such as at center post 35, includes a bracket 77 mountable on the center post 35, a pivotally mounted catch 83, and a leaf spring 89. When door 3 swings closed, trip arm 49 engages catch 83 releasing pressure from spring loaded latch 45 which in turn engages the lower segment of arm 31 locking the same in the channel of U-shaped piece 29. If for some reason this automatic locking mechanism does not operate, arm 31 can be manually positioned in U-shaped piece 29. Spring loaded latch 45 will move out of position as arm 31 is lowered into place and then snap into locking position holding arm 31 in place. Opening the door 3 results in trip arm 49 engaging spring-loaded catch 83 which causes latch 45 to pivot free of arm 31 allowing the latter to pivot out of U-shaped piece 29.

In FIG. 5, the pivotally mounted end of arm 31 is shown in U-shaped piece 29 near the hinged-portion of door 3. Mounted in frame 27 through U-shaped piece 29 and bearing member 65 positioned between walls 53 and 59 is pin 41 which engages a groove 101 in the lower segment of arm 31. Other modes of engagement between pin 41 and arm 31 may also be provided. The pin 41 is preferably fixedly attached to arm 31 and is rotatably mounted in bearing 103 in member 104 of frame 27 and bearing 105 in bearing member 65.

The operation of the assembly of this invention, as explained above in connection with describing the various figures, is extremely simple. No motors, electrical devices or other complicated mechanisms are required. The entire assembly can be readily and inexpensively mounted on a vehicle at the time of production or thereafter without need for any significant modification of the door or other parts of the vehicle. Due to the arcuate, non-planar path traversed by the arm 31, the conventional arm rest on automobile doors can be bypassed. When the door is fully opened, the arm 31 and secondary arm 39 are adjacent the steering wheel. The assembly can be equipped with buzzers to signal seat belt detachment if desired.

What is claimed is:

1. An assembly for positioning vehicular safety belts automatically in response to opening and closing of a vehicular door comprising:

1. means mountable on the interior of a vehicular door, said means having pivotal mounting means positionable on a vehicle door near the lower, hinged portion of said door, further said means having locking means positionable on said vehicle door near the lower portion of said door in spaced alignment with said pivotal mounting means,
   2. yieldable arm means pivotally mounted on one end of said yieldable arm means on said pivotal mounting means, and
   3. safety belt means having a first portion fixedly mountable interior of said vehicle and a second portion thereof spaced from said first portion a distance capable of allowing the portion of said belt between said first and second portions to restrain the forward movement of a passenger, said second portion of said belt means being operatively connected to said yieldable arm at a location on said arm spaced from said one end of said arm, said yieldable arm being adapted to automatically pivotally move, in response to opening and closing said vehicular door, in an arcuate, non-planar path between a non-restraining position when said vehicular door is open and a restraining position engageable with said locking means when said door is closed.

2. The assembly of claim 1 wherein said means mountable on the interior of a vehicular door is an elongated member having a longitudinally extending channel having dimensions sufficient to laterally contain said yieldable arm means therein when said elongated member is mounted on said vehicular door.

3. The assembly of claim 1 wherein attached to said yieldable arm and extending from said yieldable arm is a secondary arm having terminal safety belt holding means.

4. The assembly of claim 1 wherein said pivotal mounting means comprises a downwardly depending pin.

5. In a seat belt assembly including safety belt means for restraining passenger movement fixedly mounted within the interior of a vehicle, the improvement which comprises a yieldable arm adapted for pivotal mounting on the interior wall of a vehicle door, said safety belt means being operatively connected to said yieldable arm whereby said yieldable arm pivots in an arcuate, non-planar path between a first position wherein said safety belt means are in a restraining relationship to said passenger an a second position wherein said safety belt means are in a non-restraining relationship to said passenger in response to closing and opening of said vehicle door.

* * * * *